US006455117B1

(12) United States Patent
Margucci

(10) Patent No.: US 6,455,117 B1
(45) Date of Patent: Sep. 24, 2002

(54) FORMABLE TUBULAR PRODUCT

(76) Inventor: Mike A. Margucci, P.O. Box 96054, Las Vegas, NV (US) 89193

( * ) Notice: Subject to any disclaimer, the term of this patent is extended or adjusted under 35 U.S.C. 154(b) by 0 days.

(21) Appl. No.: 08/312,406

(22) Filed: Sep. 26, 1994

Related U.S. Application Data

(63) Continuation-in-part of application No. 08/176,891, filed on Jan. 3, 1994, now abandoned.

(51) Int. Cl.[7] .............................................. B29D 24/00

(52) U.S. Cl. .................. 428/36.91; 428/35.9; 428/35.8; 428/35.7; 428/34.1

(58) Field of Search .............................. 428/35.8, 35.9, 428/34.1, 35.7, 36.91

(56) References Cited

U.S. PATENT DOCUMENTS 3,959,573 A * 5/1976 Eddy et al. ................. 428/425
3,959,574 A * 5/1976 Seanor et al. ............... 428/425
4,064,355 A * 12/1977 Neroni et al. ................. 174/47
4,079,165 A * 3/1978 Morley ....................... 428/366
4,453,353 A * 6/1984 Killop et al. ................. 52/147
4,898,046 A * 2/1990 Mancewicz et al. ....... 74/502.5
5,437,899 A * 8/1995 Quigley ..................... 428/35.7

* cited by examiner

*Primary Examiner*—Josë G. Dees
*Assistant Examiner*—Michael A. Williamson
(74) *Attorney, Agent, or Firm*—Mario A. Martella

(57) ABSTRACT

A formable plastic product which may be manually shaped into various ornamental devices includes a tubular plastic sheath normally having a predetermined orientation and configuration and tending to retain that orientation and configuration absent external force varying such orientation and configuration. Received in the interior passageway of the sheath is a forming member which extends essentially the length of said sheath, the forming member including an outer surface portion which is unbonded to the sheath and spaced from intimate contact with the internal passageway of the sheath. The forming member is further characterized as being manually formable to a desired conformational shape and for retaining said desired conformational shape whereby said sheath assumes the conformational shape of said forming member as contrasted to the predetermined orientation and configuration of said tubular sheath. Various representative functional items manually formed from the tubular plastic product of this invention are disclosed.

10 Claims, 2 Drawing Sheets

Fig. 1
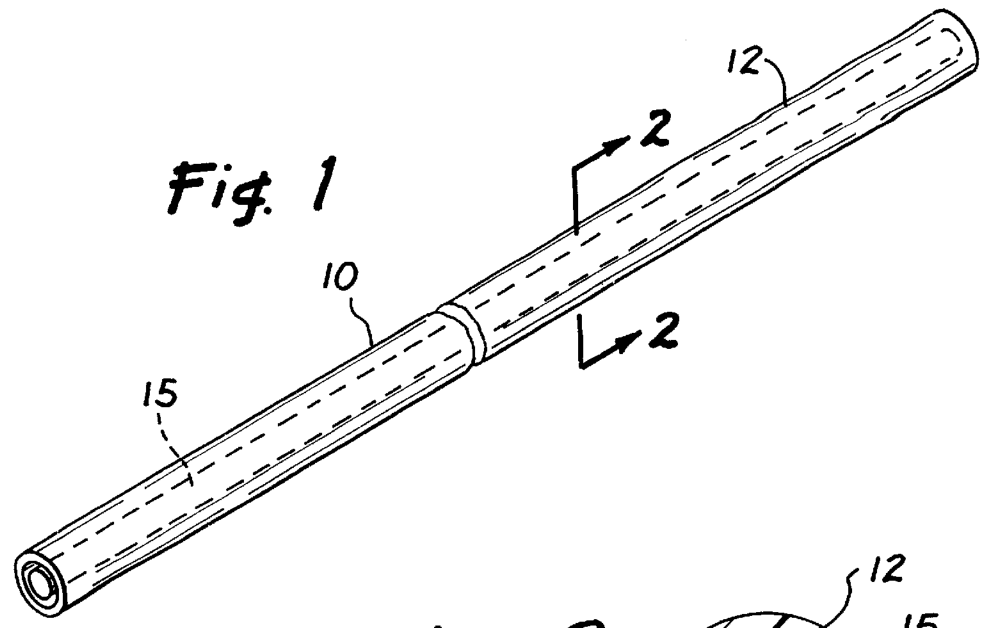
Fig. 2
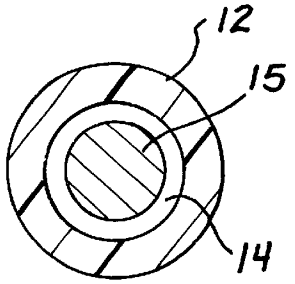
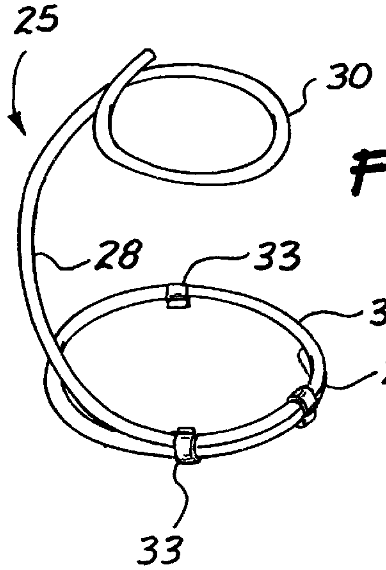
Fig. 3
Fig. 7
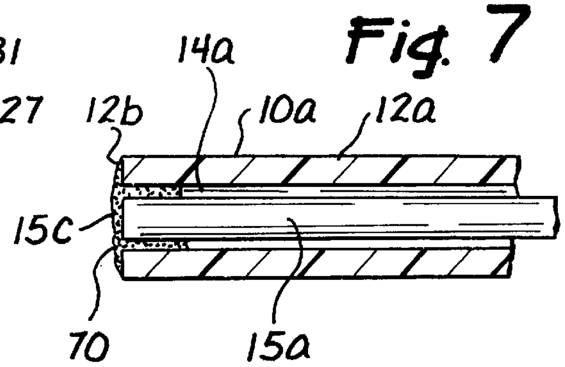
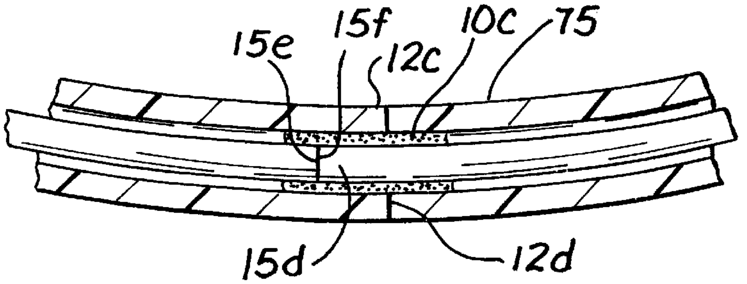
Fig 8

FORMABLE TUBULAR PRODUCT

RELATED APPLICATION

This application is a continuation-in-part of application Ser. No. 08/176,891 filed on Jan. 3, 1994, now abandoned, by the same inventor.

BACKGROUND OF THE INVENTION

1. Field of Invention

The present invention relates to a formable plastic product and more particularly to an improved formable tubular hollow plastic product which is relatively inexpensive and both easy to use and to form into a variety of shapes and configurations and in which the outer plastic tube is incapable of retaining a formed shape and in which a formable inner member, located within the hollow tube and which is capable of retaining a wide variety of formed shapes and spatial configurations, is used to cause the plastic tube to assume the configuration of the formable inner member.

2. Description of the Prior Art

Wire enclosed plastic articles are known in the art, for example, relatively heavy gage electrical conduit in which a copper or aluminum wire is enclosed by an insulator such as plastic. The plastic is in intimate contact with the wire and the latter normally is not moveable axially within the outer plastic sheath. Such a product, at least in the case of the heavier gage wire, can be formed into various shapes and the composite wire member tends to retain such a shape. Normally, such a product is not used as a decorative material due to the cost of the copper or aluminum wire.

Decorative products have also been fabricated of relatively small diameter copper tubing, however, this is expensive due to the cost of the copper. Further, if one forms a copper tubing into a tight bend, the tubing collapses.

Relatively small diameter and inexpensive plastic flexible tubing is known, for example, flexible polyvinyl chloride tubing, polyethylene tubing, polypropylene tubing, and a whole host of other polyolefin and other plastic materials, such as polyester, fluorinated plastics etc., to mention only a few.

Tubing of these materials is relatively inexpensive and readily available. It is also the case that these tubing materials may be easily manually shaped to various and different configurations. The difficulty in forming various configurations, however, is causing the tubular product to retain the formed configuration. If one uses a thermoset material it is possible to heat treat. the product so that it retains its configuration. To achieve this, it is normally necessary to hold the product in the desired configuration, heat it and hold it in the desired configuration while it cools. The need for a furnace or other heating device renders this impractical or too expensive for the casual user or hobbyist. Moreover, use of heat to cause a plastic product to retain its shape generally cannot be done with a thermoplastic material.

It is also known in the art to use rigid PVC tubing for various structures, see for example U.S. Pat. No. 4,730,633 of Mar. 15, 1988 in which PVC tubing is used for a structural support.

In another case, a medical device includes an outer tubular plastic sheath within which is located a metallic guide wire. The tubular plastic sheath is, in turn, surrounded by a second tubular plastic sheath, the device being an endoscope. Reference is made to U.S. Pat. No. 4,981,482 of Jan. 1, 1991. In this device, the metallic guide wire and plastic sheath are used to position the second tubular sheath in a desired location for drainage and thereafter the guide wire and plastic sheath are withdrawn from the second tubular sheath.

A wide variety of decorative and functional items may be made of plastic tubing except that some way to cause the tubing to retain its formed shape is necessary. For the hobbyist market, the product should be inexpensive and easily formed manually to any one of a variety of shapes. One formed to a desired shape, the tubular plastic product should retain that shape until reshaped. Reshaping is, of course, an advantage of any product used to form decorative items. Copper tubing, while decorative, is difficult to reshape due to the fact that it is relatively rigid tubing and the wall tends to collapse if bent sharply.

Thus, it is desirable to provide a formable plastic product which is inexpensive and which can be easily manually formed into a variety of shapes and which can retain such a shape.

Another object of this invention is to provide a tubular plastic product which is relatively inexpensive and which may be easily formed into a variety of shapes and geometrical configurations by relatively simple manual manipulation and which formed product will retain its formed shape for some period of time.

It is another object of this invention top provide a relatively inexpensive tubular plastic product composed of an outer plastic sheath inside of which is a forming member, the sheath being incapable of being formed into a predetermined shape and said forming member being spaced from the inside wall of the sheath and being capable of being easily formed to a wide variety of configurations and retaining such a configuration thus forming the sheath to essentially the same configuration.

It is also an object of this invention to provide a hollow and tubular formable plastic product which is inexpensive and which can be easily manually formed and reformed into a variety of shapes and which can retain such a shape and which tends to resist collapse if bent sharply.

SUMMARY OF THE INVENTION

The above as well as other objects are achieved in accordance with the present invention by the provision of a relatively simple and inexpensive tubular plastic sheath product which is formable into a variety of various products, as will be described in detail.

Thus, the tubular plastic product of this invention includes an outer plastic sheath which is incapable, in and of itself, of being formed into any predetermined decorative configuration and retain that configuration over time. In fact, the plastic sheath is of a type of plastic material which inherently does not retain its shape after its manufacture. Typical such materials are described.

In order to be able to form the tubular plastic sheath into a desired configuration, the interior passageway of the sheath includes a forming member, preferably a wire like member which can be manipulated by hand into any one of a variety of shapes, as will be discussed and illustrated by way of example. In a preferred form the forming member is free to move axially in the sheath and is preferably of approximately the same length as the outer sheath. In effect, the sheath forms a decorative outer cover for the forming member. The forming member also tends to prevent the tubular sheath from collapsing if the forming member and thus the sheath are bent sharply. Thus, a wide variety of materials may be used to form the outer sheath, the preferred materials being the environmentally benign plastics which are relatively inexpensive.

Accordingly, the formable plastic product of this invention preferably includes a tubular plastic sheath having a predetermined length and an internal passageway of predetermined internal diameter. The tubular sheath normally has a predetermined orientation and configuration tending to retain that orientation and configuration absent external force varying such orientation and configuration. To provide a mechanism for forming the tubular sheath into a desired configuration, a forming member is received in the passageway and extends essentially the length of said sheath. The forming member includes an outer surface portion which is unbonded to the sheath along a substantial portion of its length and spaced from intimate contact with the internal passageway of the sheath. The forming member is further characterized as being manually formable to a desired conformational shape and for retaining the desired conformational shape whereby said sheath assumes the conformational shape of the forming member as contrasted to the predetermined orientation and configuration of the tubular sheath. In the case of sharp bends, the forming member also prevents total collapse of the sheath.

The plastic tubular product of this invention may be formed into a wide variety of ornamental and creative products ranging from plant holders to desk top pen holders, and the like. The product of this invention is intended primarily for use by hobbyists and to permit fabrication of various ornamental and decorative products by hand and without the need for expensive and complex forming tools or dies.

It will be apparent from the following description, which should be read together with the accompanying drawings, that there are other advantages of the present invention as is apparent from the disclosed preferred embodiments of the various forms of this invention.

BRIEF DESCRIPTION OF THE DRAWINGS

FIG. 1 is a view in perspective, on an enlarged scale, of the novel formable plastic tubing assembly of this invention;

FIG. 2 is an end view of the tubing assembly illustrated in FIG. 1;

FIG. 3 is a view in perspective of the plastic tubing of FIG. 1 after the latter has been formed into a relatively simple predetermined shape;

FIG. 7 is a view in perspective, on an enlarged scale, of a modified form of plastic tubing product in which the ends are sealed in accordance with this invention;

FIG. 8 is a perspective view of the plastic tubing product of this invention formed into basically a continuous loop.

DESCRIPTION OF THE PREFERRED EMBODIMENTS

Figure 4:
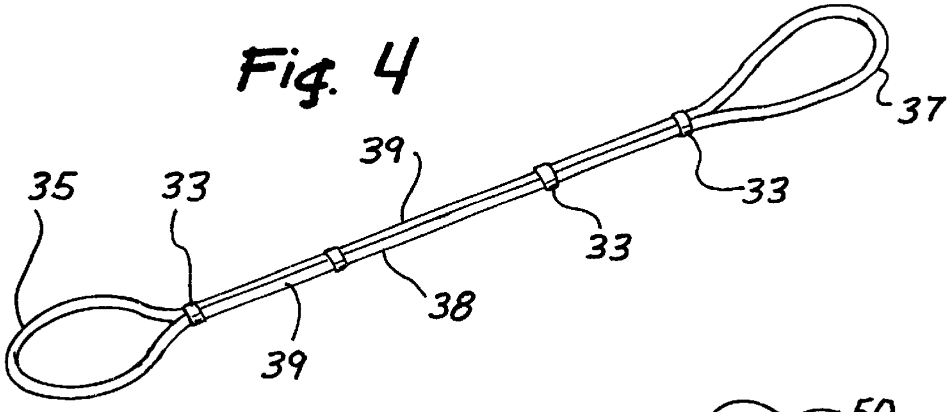
FIG. 4 is a view in perspective of the plastic tubing of FIG. 1 after the latter has been formed into another relatively simple predetermined shape.

Referring to the drawings, FIG. 1 illustrates a preferred form of the present invention, although it is understood that the present invention is not limited thereto. As shown, the tubular plastic product 10, shown on a much enlarged scale for purposes of illustration and explanation, includes an outer tubular and hollow plastic sheath 12. The product 10 is illustrated with a break line since the length may be several feet.

The plastic may be of any of a variety of plastic materials, preferably environmentally benign and safe for handling by humans and safe for animals. Typical such plastic materials are polyvinyl chloride tubing, polyethylene tubing, polypropylene tubing, and a whole host of other polyolefin and other plastic materials, such as polyester, fluorinated plastics etc., to mention only a few. Regardless of the specific plastic material used, it is also a characteristic of the hollow plastic tube that it is easily bent, and formed into a shape but incapable of being manipulated to form and to hold a formed shape. For example the tubing can be formed into a circular element or shape quite easily, but once released, the tubular element tends to revert to the shape in which the tube was originally formed. Since most tubing is formed by extrusion into long, straight lengths, tubing which is formed into a circular configuration will tend to uncurl into a straight length. This quality, the ability to be formed into a curved configuration, and the inability of the plastic tube to retain that formed configuration are important practical qualities for the tubing itself. In general, hollow plastic tubing of this type is relatively inexpensive and is thus attractive to the hobbyists as a material to fabricate into different products. It has the disadvantage, however, that it can be collapsed if bent sharply, similar to what occurs with copper tubing.

In a preferred form, the plastic may be transparent or slightly translucent. It is within the scope of this invention to use a plastic which is dyed, pigmented or stained to provide a desired color or pattern of colors and even an ornamental design, although the latter may add to the cost of the tubular plastic member. The outer plastic sheath 12 is preferably tubular and hollow along its full length and round in cross-section. Typically, the tubular sheath is of a relatively small outside diameter, for example, about ¼ inch although other diameters may be used. Further, the wall thickness of the tubing is sufficiently thin to assure that the tubing is flexible. The use of a relatively thick wall may effectively provide a relatively rigid tube.

Positioned within the interior 14 of the tube 12 is a forming member 15. The forming member extends essentially the entire length of the tubular sheath 12 and is of a sufficiently smaller diameter than the interior cross-section to be moveable axially along the length of the tubular sheath. The forming member 15 is not affixed or attached to the tubular sheath along a substantial portion of the length and in fact there is a clearance between the outer surface of the forming member and the inner surface of the interior 14, as seen in FIG. 2. In general, the length of the forming member is basically the same as that of the tubular sheath 12. The forming member is preferably a formable metal member, circular in cross-section and of a diameter sufficiently smaller than the interior opening of the tube 12 to be received therein.

The forming member 15 is somewhat stiff in the sense that it will retain its shape, but sufficiently soft and pliable to be formed and reformed into any desired shape, as will be described. The forming member may be 12 gauge hanger wire or other suitable gauge, such as 8, 10 or 14, depending on the internal diameter of the tubular plastic sheath and the stiffness or formability of the forming member. Since the forming member may be formed and reformed into various configurations, it is preferred that the forming member be solid as opposed to hollow. A hollow forming member has the disadvantage that it may only be formed and reformed a relatively few times due to collapse of the walls. The basic function of the forming member is to permit the plastic product to assume the shape and configuration of the forming member. In effect, the forming member controls the configuration and shape of the plastic tube, the latter being incapable by itself of retaining a curved shape or other curved configuration. The forming member also assists in preventing the collapse of the tubular sheath in the even,t that the sheath and forming member are bent sharply.

The manufacture of the tubular plastic product 10 includes formation of the tubular plastic sheath 12, typically by extrusion, and formation of the forming member. The plastic sheath may be cut to suitable lengths of ten to twelve feet and the forming member assembled thereto. The resulting product may be packaged in axial lengths of ten to twelve feet or in coils of 2 to 3 feet in diameter. It is preferred that coils not be smaller than 2 to 3 feet due to the difficulty of uncoiling and using the product thereafter. The finished product has the appearance of a solid round plastic member, sufficiently rigid to retain its shape. However, the product is also sufficiently formable to be formed into a variety of shapes and is capable of retaining such shapes.

The formed shapes may vary from relatively simple to somewhat complex, all being manually formable without the need for special forming equipment, other than relatively simple mandrels for forming curved items of uniform diameter. For example, FIG. 3 illustrates a small potted plant holder 25 made of the plastic tubular product of this invention. The plant holder includes a base 27, an upwardly extending vertical arm 28 and an upper circular plant holder section 30. The base 27 is formed of a circular section of a somewhat larger diameter than the plant holder section 30. Portions of the base include a portion of a double coil 31, the coils held together by ties 33 which may be cable ties or strapping tape. The ties may also form a support which contacts the supporting surface. Extending vertically as an extension of one of the coils is the vertical arm 28, the latter being arcuate as shown. The vertical arm terminates in the plant holder section 30 which is also in the form of a coil. It is apparent that the plant holder 25 is not intended to be used with heavy potted plants, but those of smaller size. In use, the holder section engages a shoulder on the plant pot such that the lower end of the pot extends downwardly towards the base but is spaced vertically therefrom.

The formation the plant holder 25 involves forming the coiled sections at each end of the vertical arm. One manner of forming the coils is to use a mandrel and to wrap the tubular product around the mandrel. Such an action causes the metal forming member to assume the coiled configuration of the outside of the mandrel, thus causing the plastic sheath to be formed into a coil. One may use a mandrel of appropriate diameter, or a mandrel having a curved surface as a guide for the curvature. Again, this forming operation may be manually performed since the forming may be performed manually to the desired configuration. It is understood that virtually any curved product may be used as a mandrel.

FIG. 4 illustrates another product 35 of a relatively simple shape and formed from the tubular plastic product of this invention. The product 35 is in the form of a hanger for suspending items, and includes loops 36 and 37 at each end, with a relatively straight section 38 between the loops. For example, the hanger may be used to suspend items from ceiling hooks, door knobs, wall supporters, shower heads, and the like. In this form, each of the loops may be formed manually without the use of a mandrel. The loops are of a dimension sufficient for the hand of an adult to pass through the loop. Ties 33, already described, are used to keep the loops shape at the intersection of the straight section 38 since the latter is made up of two legs of the tubular plastic member. In this form, the hanger 35 is formed of one length of tubular plastic member, the latter having ends joined together as indicated at 39 and which will be described. The end loops may be of the same or different diameters, and a portion of the outer plastic sheath my be removed for decorative purposes where it is desired to create the illusion that the tubular plastic member passes through the item being supported.

Figure 5:
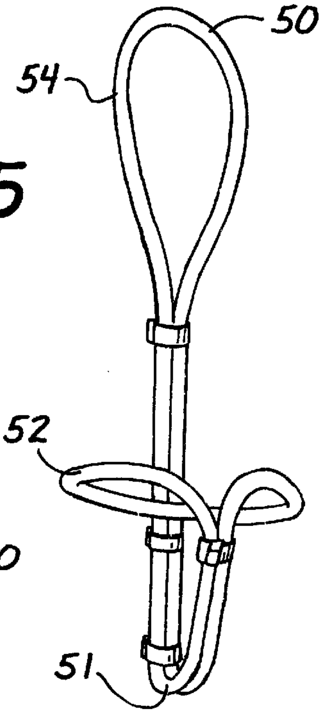
FIG. 5 is a view in perspective of an attractive shaped product formed of plastic tubing products as shown in FIG. 1 but of a more complex shape than those described.

More complex shapes may also be fabricated from the tubular plastic product of this invention. For example, FIG. 5 illustrates a plant hanger 50 which is basically a modification of the hanger 35 of FIG. 4. In this case the relative straight center section has been bent as illustrated at 51 and the loop 52 has been displaced to lie in a plane different from loop 54. The loop 52 may also be oriented to point away from the bend section 51. The structure has sufficient strength to maintain the bend section 51 and the loop 52 in the respective orientation illustrated. This is achieved since the forming member itself retains the shape and configuration into which it was formed and thus keeps the outer sheath in basically the same configuration even though the outer sheath is inherently incapable of retaining the shaped configuration absent the forming member. A plant may be placed in loop 52 and suspended from any appropriate supporting structure. The hanger also illustrates the ease with which a variety of different products may be fashioned since the hanger 50 is merely a modified form of the hanger 35.

Figure 6:
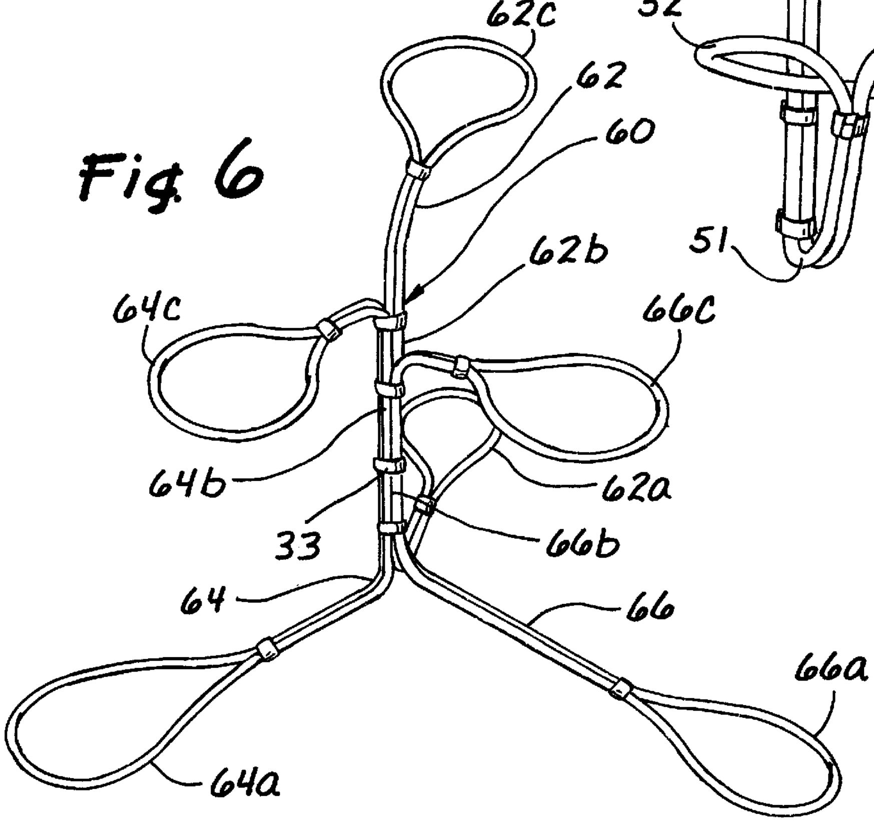
FIG. 6 is a view in perspective of yet another formed product in accordance with this invention dn which is of still further complexity and which has been fabricated from the plastic tubing product of FIG. 1.

FIG. 6 illustrates an even more complex product 60 again fabricated from the tubular plastic product of this invention and as illustrated in FIG. 1 hereof. In effect, the product 60 is a plant stand composed of basically three hangers of the type illustrated in FIG. 4, but each configured differently from what has been heretofore described. In this particular case, each of the hangers 62, 64, 66 is configured to include a base 62*a*, 64*a* and 66*a* adapted to rest on a suitable support surface. Associated with each base and connected thereto through a center vertical support section 62*b*, 64*b*, and 66*b* are plant holders 62*c*, 64*c* and 66*c*. To hold the entire assembly together, the vertical support sections are held together by ties 33 of the type previously described. In this instance each of the bases and plant holders are disposed horizontally and in spaced vertical planes. Also each of the bases and plant holders extend in the same direction. While the bases and plant holders are illustrated in the form of loops, it is to be understood that other shapes may be used and the loops may be of the same or different sizes. For example, the bases may be ovoid and the plant holders may be circular.

The device of FIG. 6 illustrates the variety of possible configurations which is possible with the tubular plastic product of this invention.

Referring now to FIG. 7, a modified form of tubular plastic product 10*a* is illustrated and includes an outer plastic sheath 12*a* and a forming member 15*a* as already described. As in the form described, the forming member 15*a* is spaced from the interior wall 14*a* of the sheath 12*a*. However, in this form, at least one end 15*c* of the forming member 15*a* is spaced inwardly of the end 12*b* of the sheath 12*a*. Received in the end 12*b* of the sheath is a plug 70 which contacts the inner wall 14*a* and the end 15*c* of the forming member. The purpose of the plug is to close off the end of the plastic sheath and to keep the forming member 15*a* from moving axially of the sheath 12*a*, i.e., the end of the forming member is always recessed with respect to the end of the sheath. The plug may also be used for cosmetic purposes so that the ends of the sheath appear neat. A plug 70 may be used in only one or optionally each end of the sheath. The plug may be formed of silicon sealant or room vulcanizable rubber or epoxy or other suitable material. Colored or clear plugs may be used.

In some cases, it is desirable for the tubular plastic product of this invention to have the appearance of a continuous loop, as contrasted to a product having two free ends. Referring to FIG. 8, another form of tubular plastic product 10*c* is illustrated. In this form, the ends of the forming member 15*d* are arranged such that one end 15*e* is recessed from the adjacent end 12*c* of the sheath while the other 15*f* extends beyond the end 12*d* of the sheath. In this way, end 15*f* may be inserted into end 12*c* of the sheath and the two ends joined together with an adhesive 75. This same general arrangement may be used to join together lengths of plastic tubular product, although the resistance to tensile forces is not great absent an adequate adhesive bond.

It is apparent that the tubular plastic product of this invention is relatively simple and inexpensive and offers a starting from which any number of other articles may be formed manually so as to have the overall appearance of plastic tubing of attractive conformational shape. The product of this invention also offers the opportunity to form utilitarian products, such as those described. It is also possible to form the product and thereafter coat the outer surface of the plastic sheath to provide various external designs and patterns. It will be apparent to those skilled in the art, from the above detailed description that various changes and modifications may be made, as will be apparent to those skilled in the art, without departing from the spirit and scope of this invention as set forth in the appended claims.

What is claimed is:

1. A formable decorative product having at least one vertical extention comprising:

a tubular plastic outer sheath having a predetermined length and an internal passageway of predetermined internal diameter, said outer tubular sheath normally having a predetermined orientation and configuration and tending to retain that orientation and configuration absent external force varying such orientation and configuration, a forming member received in said passageway and extending the length of said sheath whereby the length of said sheath is approximately equal to the length of said forming member, said forming member being a solid, bendable wire having an outer diameter which is less than the internal diameter of said outer sheath and including an outer surface portion which is unbounded to said sheath and, in an uncurved condition thereof, being unsupported by said sheath and being spaced from intimate contact therewith and with the internal passageway of said sheath and, in an uncurved condition thereof, being in opposed facing and spaced relationship with said outer tubular sheath and being essentially centrally located in said sheath so as to form an annular space between the outer surface of said forming member and the inner surface of said sheath in any uncurved portion thereof, said forming member being further characterized as being manually formable to a desired conformational shape whereby said sheath assumes the conformational shape of said forming member as contrasted to the predetermined orientation and configuration of said outer tubular sheath, and said forming member including at least one curved portion whereby the outer sheath follows the contour of the curved portion of the forming member in said curved portion and the outer surface of said forming member is in contact with the inner surface of said outer sheath along at least some portion of said curved portion operating to cause the outer sheath to follow the contour of the curved portion of said forming member.

2. A formable plastic product as set forth in claim 1 wherein said forming member is a solid cylindrical member having an outside diameter less than the predetermined inner diameter of said internal passageway.

3. A formable plastic product as set forth in claim 1 wherein said forming member is moveable axially with respect to said sheath.

4. A formable plastic product as set forth in claim 1 wherein a plug is provided in at least one end of said sheath, said plug contacting at least the adjacent end of the forming member and said sheath for retaining said forming member in said sheath.

5. A formable plastic product as set forth in claim 1 wherein at least one end of said forming member is formed into a loop thus causing said sheath to assume the configuration of a loop.

6. A formable plastic product as set forth in claim 5 wherein said forming member includes a vertical section having a loop at one end and a curved section at the other end, and said sheath being of a configuration which follows the configuration of said forming member.

7. A formable plastic product as set forth in claim 6 wherein said curved section is a second loop.

8. A formable plastic product as set forth in claim 7 wherein said second loop is oriented in a plane different from said loop.

9. A formable plastic product as set forth in claim 1 further including plug means in at least one end of said tubular plastic sheath.

10. A formable plastic product as set forth in claim 1 wherein one end of said outer tubular sheath is joined to the other end of said outer tubular sheath.

* * * * *